Dec. 17, 1940.  S. G. MARRIOTT  2,225,068
BUN TOASTING MACHINE
Filed June 17, 1940  2 Sheets-Sheet 1
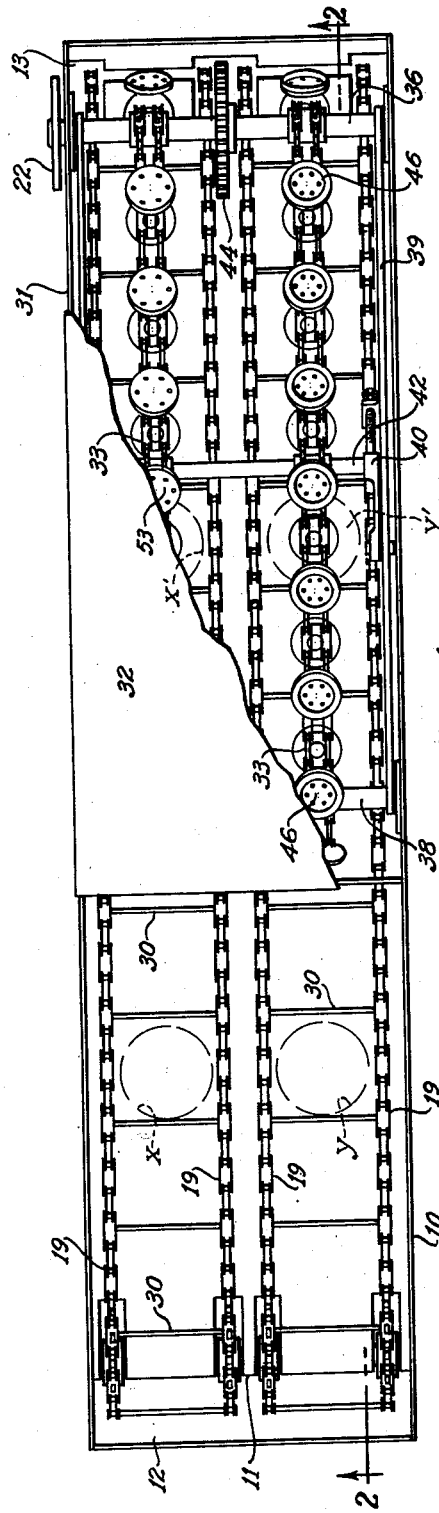
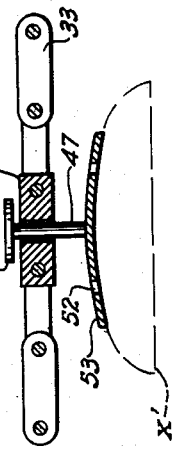
Fig. 5
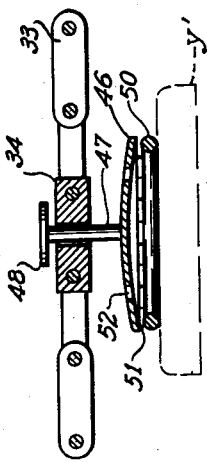
Fig. 4
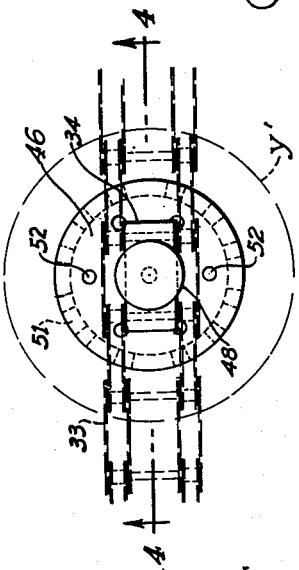
Fig. 3
Inventor
Sherman G. Marriott
By T. J. Geisler and
F. A. Geisler.
Attorneys Dec. 17, 1940.    S. G. MARRIOTT    2,225,068
BUN TOASTING MACHINE
Filed June 17, 1940    2 Sheets-Sheet 2

Inventor
Sherman G. Marriott
By T. J. Geisler and
F. R. Geisler.
Attorneys

Patented Dec. 17, 1940

2,225,068

UNITED STATES PATENT OFFICE 2,225,068

BUN TOASTING MACHINE

Sherman G. Marriott, Portland, Oreg.

Application June 17, 1940, Serial No. 340,982

15 Claims. (Cl. 53—5)

This invention relates to a bread-toasting machine and, in particular, to a machine for toasting sliced bread buns of the type commonly used for "hamburger" sandwiches and the like.

One of the objects of this invention is to provide a continuously operating, high production machine in which sliced buns and the like may be placed, and from which they will be delivered properly toasted a short time thereafter.

Another object of this invention is to provide a bun-toasting machine in which the two halves of sliced buns may be toasted and then delivered simultaneously.

A further object is to provide suitable means not only for toasting the cut surfaces of the bun halves, but also for thoroughly heating the bun through while the toasting is taking place, but without danger of burning any portion of the bun, so that the toasted bun halves will stay warm for a longer period of time when made up into a sandwich, and thus preserve the crisp freshly-toasted flavor longer and thereby produce a more palatable sandwich.

When bread buns, of the type commonly used for such sandwiches, are sliced and toasted, the cut surface of each half bun has a tendency to become concave as the heat penetrates into the cut face. As a result, in ordinary toasters, the outer rim of the cut face of the bun is very apt to become burned before the concave central portion has become toasted. A special object of this invention accordingly is to provide a toasting machine in which such tendency of the cut face to become concave will be prevented and which will insure the even toasting of the entire face. This particular object I accomplish by arranging suitable weights to press down on the top of the inverted bun halves to press the cut faces against the toasting plate. However, when such freshly cut faces are pressed against a hot toasting plate, if the cut face is not first given an opportunity to dry out or become slightly seared, there is danger for the cut face to stick to the toasting plate. To avoid this danger I allow the bun halves to remain on the toasting plate for an interval before the weights are automatically applied and vary the temperature along the toasting plate, in a manner hereinafter explained, to eliminate further any danger of the sliced bun sticking at any point to the plate.

A still further object of this invention is to provide such a toasting machine which will be sturdy, simple, and inexpensive of construction, but which will be easy to clean and simple to operate and maintain.

These objects, as well as other objects and incidental advantages, I obtain in general by providing a toasting machine with a toasting surface over which the sliced buns to be toasted are moved through the medium of a plurality of endless chains; by heating different portions of the toasting surface to different degrees of temperature and thus subjecting the sliced faces of the buns to different degrees of heat; by enclosing the buns in a heating oven during the latter part of the toasting, thereby causing the toasting buns to become thoroughly heated through before being delivered from the toasting machine; and finally by applying means at a certain stage of the toasting for keeping the cut face of each bun section pressed flat against the toasting surface to insure the even toasting thereof.

These features of my invention will be apparent from the following brief description of a preferred embodiment of my bun-toasting machine which is illustrated in the acompanying drawings forming part of this specification.

In the drawings:

Figure 1 is a plan view of my bun-toasting machine with a portion of the top cover of the upper oven compartment broken away in order to reveal interior mechanism;

Figure 3 is an enlarged plan view of one of the near-side series of members designed to keep the bun face pressed against the toasting surface;

Figure 4 is a vertical section taken on line 4—4 of Figure 3 showing the member in position on the inverted lower half of the sliced bun; and Figure 5 is a section, similar to Figure 4, but taken of one of the far-side series of members and showing this in position on the top half of the bun during the toasting operation.

Figure 2:
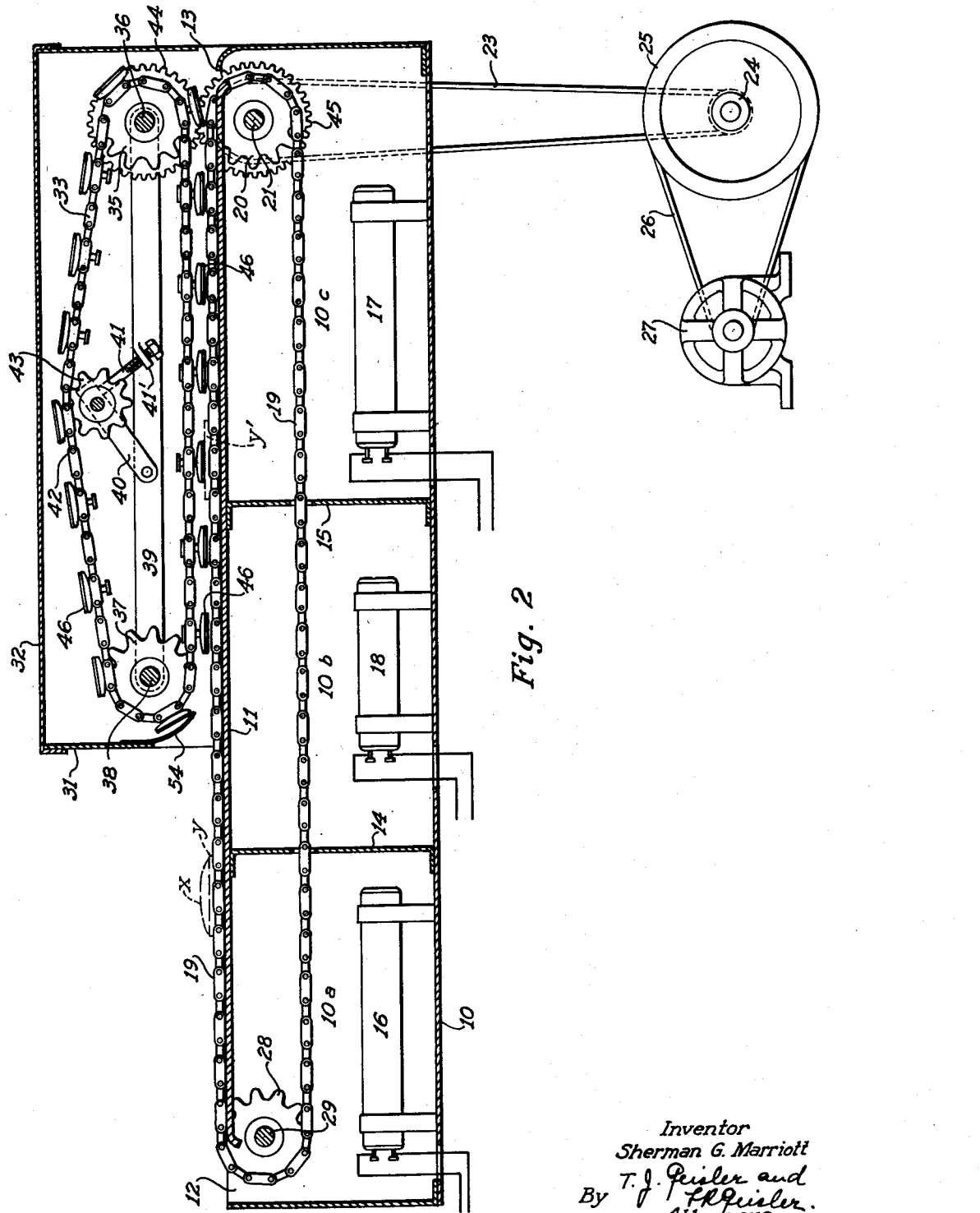
Figure 2 is a vertical longitudinal section taken on the line 2—2 of Figure 1.

Referring first to Figure 2, an elongate oven 10, formed of sheet metal or other suitable material and constituting a baselike structure, is provided with a substantial top plate 11 which covers the entire top of the bottom oven structure with the exception of narrow apertures 12 and 13 at the left and right-hand ends respectively. This bottom oven structure is divided by the vertical partitions 14 and 15 into three compartments 10a, 10b, and 10c, which are heated by the electrical heating elements 16, 18 and 17, respectively. These heating elements are connected by suitable conductors and regulating means (not shown) to a source of electric power. The heat generated by these heating elements 16, 18 and 17, causes the top plate 11 to be heated throughout its extent. This top plate has a smoothly finished upper face and constitutes the toasting surface of the machine. The heat generated in the compartments 10a, 10b and 10c, is sufficient to cause the smooth top toasting plate 11 to be heated to a temperature high enough to toast the sliced buns which are moved over it from left to right.

For a reason which will be explained later, the end compartments 10a and 10c are heated to a higher temperature than the middle compartment 10b, in which the smaller electrical heating element is placed, and thus the portion of the toasting plate 11 will be hotter above the end compartments 10a and 10c than above the middle compartment 10b.

The sliced buns are moved along the toasting plate 11 from left to right by two identical conveyors (see Figure 1), each composed of a pair of endless chains 19. These chains are driven in unison by four sprockets 20 (Figure 2), keyed on a shaft 21 disposed in suitable bearings in the compartment 10c. Shaft 21 extends through the rear side wall to carry a belt pulley 22 (Figure 1) at the outside rear end of the shaft. The belt pulley 22 is connected by suitable speed-reducing means, including the belt 23 (Figure 2), the pulleys 24 and 25, and the belt 26, to the electric motor 27. The chains 19 also pass around four idling sprockets 28 at the other end of the machine, these sprockets 28 being carried on the shaft 29 which is journaled in suitable bearings in the compartment 10a. The upper stretches of the four chains 19 thus rest on the top toasting plate 11 and are moved from left to right thereon by the rotation of the pulleys 25, 24 and 22 in a clockwise direction. Flights 30, consisting of transverse rods or bars, attached at regular intervals to each pair of chains 19, serve to convey the sliced buns along the toasting plate 11. These flights and chains pass through the apertures 12 and 13 at the ends of the toasting plate 11 and also through suitable apertures in the partitions 15 and 14.

The portion of the toasting plate 11 at the left end of the machine, and above the heating compartment 10a, is exposed in order to afford space for the receipt of the buns to be toasted, but the remainder of the top toasting plate is enclosed by a superimposed oven 31 through which the sliced buns are caused to pass during the toasting and heating process. This top oven 31 is provided with a removable tight-fitting cover 32. Inside this upper oven 31 are two conveyors 33, 33, each composed of a pair of endless chains which are spaced apart just sufficiently to accommodate a series of blocks 34 carried by these pairs of chains and attached to the chains at regular intervals, these blocks in each pair of chains being spaced apart at intervals equal to the spacing between the successive flights 30 of the main conveyor chains 19. In operation these blocks 34 are positioned midway between the flights 30.

The chains 33 are driven by two pairs of sprockets 35 which are keyed to a shaft 36 journaled in suitable bearings in the right-hand end of the upper oven 31. These chains also pass around the idling sprockets 37 carried on a shaft 38, journaled in bearings at the left-hand end of the upper oven 31. The chains 33 are driven at exactly the same speed as the main conveyor chains 19 by meshing spur gears 44 and 45 keyed to the sprocket shafts 36 and 21, respectively.

At each side of the upper oven 31 a rigid bar 39 (Fig. 2) has its ends disposed on the shafts 36 and 38, and midway of its length, an arm 40 is pivotally mounted. The upwardly-extending end of this arm is supported by a set screw 41 threaded in a lug 41' formed in the bar 39. The upper ends of this pair of pivotally-mounted arms 40 support the ends of a shaft 42, and the shaft 42 carries two pairs of sprockets 43 over which the uppermost spans of the chains 33 pass, and which serve to keep these chains taut by virtue of the adjustment provided by the set screws 41 and pivotal arms 40. The three sets of sprockets 35, 37 and 43 are so positioned on the shafts 36, 38 and 42, respectively, that the blocks 34, fastened between the pairs of chains 33, will traverse courses parallel to the line of travel of the main conveyor chains 19 and central of each pair of main conveyor chains, substantially as shown in Figure 1.

Each of the uniformly-spaced blocks 34, on each of the pairs of chains 33, serves as a bearing and support for a disc weight designed to press down on a half bun during the toasting process in order to keep the sliced face of such half bun, which is the surface to be toasted, pressed flat against the toasting plate 11. The near-side series of discs 46 of the machine illustrated are designed to be used for the lower half of the bun, while the far-side series of discs 53 are designed for the upper half of the bun. Each disc 46 or 53 is attached to a central stem 47 which is reciprocally disposed in one of the blocks 34. The opposite end of the stem 47 is flanged as at 48 (Figures 4 and 5) to prevent the stem slipping through the block. The discs 46 and 53 are preferably concave and are provided with a plurality of holes 52 to facilitate the escape of vapor or steam from the buns during the toasting and heating. I have found it desirable to have the diameter of these discs approximately two-thirds the diameter of the bun, although the discs may be made somewhat larger or smaller and still function satisfactorily.

The near-side series of discs 46, of Figures 1 and 2, are intended to be used for the inverted bottom halves of the buns, and I prefer to provide these with rings 50 of approximately the same diameter as the discs 46 (see Figure 4). These rings 50 are secured to the concave face of the discs 46 but are preferably spaced therefrom so as to provide additional apertures 51 around the periphery of the discs to aid in the escape of the steam or vapor.

The discs 53 of the far-side series which are designed to be used for the top halves of the buns, as indicated in Figure 5, do not have any rings attached thereto, and the curvature of the concave faces of the discs conforms approximately to the average curvature of the top of the buns.

In operation, the buns, after being sliced or halved in the usual manner, are placed with their sliced faces down on the toasting plate 11 at the left-hand end of the toasting plate in the spaces between the pairs of flights 30 and the chains 19. The top halves of the buns, $x$ and $x'$, are placed in the far-side spaces, while the bottom halves, $y$ and $y'$, are placed in the near-side spaces. These half buns are then slowly moved along the heated toasting plate 11 by the flights 30 on the conveyor chains. In addition to being toasted on their sliced faces by continuous contact with the toasting plate 11, the half buns become thoroughly heated through while they are in the upper or superimposed oven 31 which thus serves as a "Dutch" oven.

With the ordinary method of toasting sliced buns, the cut faces have a tendency to become concave as the heat drives into the sliced face, as previously mentioned, with the result that the rim of the bun may burn before the raised central portion has become toasted. However, the weight of the discs 46 or 53, pressing down on these bun halves is sufficient to keep the sliced faces pressed against the toasting plate 11, and thus prevent these sliced faces from becoming concave during the heating and toasting so that uniform toasting of the sliced faces is assured.

Previous attempts which have been made to keep the sliced faces of buns pressed against a hot toasting surface, in order to prevent such sliced faces becoming concave and thus burning on the outer rim before becoming properly toasted over the entire face, have been unsatisfactory largely because the pressing of the freshly sliced face against a hot metal surface has a tendency to cause the face to stick to the surface, especially the soft center portion of the bun face. This results not only in pulling portions loose from such face, which may, if the pulled away portions are sufficiently large, render the bun half unfit for serving, but also results in the accumulation of crumbs and larger pulled away portions sticking to the toasting surface or plate so that the latter must be frequently scraped causing much delay and inconvenience. After considerable experimenting in an endeavor to overcome these difficulties I discovered that if the sliced bun face is first placed on a very hot toasting plate without any pressure being applied for a short interval until the sliced face becomes slightly dried or seared, and also slightly concave, and then is moved to a cooler plate, or cooler portion of the same plate, and the pressure applied to flatten out the face against the plate, there will be no tendency of the sliced face at any time to stick to the plate. Accordingly the sliced bun halves are first placed on the toasting plate 11 above the compartment 10a, which portion of the toasting plate is heated very hot by the large heating element 16. This immediately has the effect of slightly searing the bun face and causing it to become slightly concave as the bun half is moved towards the right. However, I have found that if a weight were to be placed even then on top of the bun half, while the sliced face is still in contact with this very hot section of the toasting plate, some tendency for the center of the bun face to stick when pressed against the plate persists. But if the temperature of the plate is first reduced before the pressure is applied this tendency will disappear entirely. Therefore, before entering into the upper oven 31 and being subjected to pressure from one of the disc weights, the bun half passes over the first part of the second section of the toasting plate, namely the portion located above the middle compartment 10b. This compartment is heated by a smaller heating element 18 to a much lower temperature than either of the adjacent compartments 10a or 10c, and consequently the toasting plate 11 has its coolest place approximately at the midway point between the partitions 14 and 15. This is approximately where the weights first drop onto the bun halves, as will be apparent from Figure 2, and this is an important feature of my machine since all tendency of any part of the sliced face of the bun to stick to the toasting plate is thereby eliminated. From the moment the weight drops onto the bun half, until the bun half leaves the machine, the toasting temperature is rapidly increased, and the surface of the toasting plate above the compartment 10c, due to the large heating element 17 and also to the fact that this part of the toasting plate is entirely enclosed, becomes very hot, thus quickly toasting the bun face now pressed against the plate to the desired toast-brown color.

As the disc weights 46 and 53 are moved with the upper spans of the chains 33 from the sprockets 35 towards the left, the stems 47, which have slid downwardly through the blocks 34, permit the discs to rest on top of the blocks 34 as shown in Figure 2. It is desirable to keep these discs against the outer faces of their blocks until the discs have passed around the sprockets 37 and have been brought into a position where they may drop in a vertical direction onto the tops of the bun halves positioned in the conveyor sections directly below them. This I accomplish by providing a curved strip of metal 54 which is secured along its top edge to the end plate in the left-hand end of the upper oven 31, and which is adapted to bear in a resilient manner against the disc weights 46 and 53, as they pass around the sprockets 37 in a counter-clockwise direction. As the discs clear the lower edge of this curved strip 54 they will then immediately drop on top of the bun halves and from then on will rest on these bun halves until the latter are ready to be discharged from the machine. As previously explained, the movement of the conveyor chains 19 with their flights 30, and the movement of the upper chains 33 are coordinated, and the blocks 34 are so located that the discs are always resting on the center of the underlying bun halves, and thus will always be positioned above the center of the spaces marked off by the flights 30.

Due to the fact that the bottoms of the buns are substantially flat, and that the lower halves of the buns generally are composed of considerably denser material than the upper halves, I have found that more weight is generally required to keep the sliced faces of the lower halves of the buns flat against the toasting plate 11, than is required in the case of the upper halves. I have also found that this weight is preferably applied in a different position on the lower half of the bun from the upper half. Accordingly I provide the discs of the near-side series, namely discs 46 adapted to be used with the lower halves of the buns, with further weight in the form of rings 50. The diameter of these rings is preferably about two-thirds that of the bun, as previously mentioned, and as shown in Figures 3 and 4, so that the weight of the disc and ring is brought to bear in the proper location on the inverted bottom of the bun, so as to press the entire sliced face most efficiently against the toasting plate. The rings 50 not only increase the weight of the discs 46 sufficiently to provide the force necessary to press the denser lower halves of the buns down on the toasting plate, but also, by leaving a space on the inside of the rings and discs, facilitate the escape of vapor and steam from the denser lower bun halves. The appertures 51, between the rings 50 and the perimeters of the discs 46, in addition to the vent holes 52, permit such vapor and steam which may collect inside this space to escape quickly and freely.

To the discs 53 of the far-side series, which I have arranged to bear on the top halves of the buns, it is not necessary to attach the rings 50. Since the concave faces of the discs coincide with the curvature of the tops of the upper halves of the buns, exerting pressure practically uniformly over a central portion, constituting about two-thirds of the diameter of the bun, I have found that it is sufficient, to insure the even toasting of the sliced faces of these comparatively light upper halves of the buns, to have the discs rest directly on the tops of the buns. The vent holes 52 provide sufficient escape of the steam from the covered tops of the buns in this case.

Thus, in the machine which I have described, the bun halves, while being automatically moved through the machine, have their sliced faces toasted uniformly and completely, the curving of these sliced faces being prevented by suitable superimposed weights. There is no danger of the bun halves becoming soggy under these superimposed weights, since the steam and vapor generated in the buns during the toasting are afforded ample opportunity to escape. Due to the fact that the heat is applied in a graduated degree to the toasted face, the toasting is not completed until the bun is ready for delivery from machine and too rapid toasting or scorching of the sliced bun face is avoided. Finally the bun sections are heated not only on the sliced toasted faces, as is frequently the case when buns are toasted in ordinary toasters, but the entire bun becomes thoroughly heated to just the right proportions immediately before delivery so that the bun will have an unusually fresh crispness and toasted flavor, and will retain this tasty crispness longer than the average toasted bun.

It is possible, of course, to make various modifications in the individual parts and members of the machine without departing from the principle of my invention. Variations of the construction of the conveyor means will suggest themselves, and variations in the shape and construction of the disc weights may be made, since these can be changed to suit different types and shapes of rolls, buns, or other articles to be toasted. It is not my intention therefore to restrict my invention to the particular form and construction of my machine as described and illustrated, nor otherwise to limit my invention, except as set forth in the appended claims.

I claim:

1. In a toasting machine of the character described, a toasting plate, means for heating said toasting plate, said means so arranged that a portion of said plate near the delivery end of said machine will be heated to a high toasting temperature and a portion of said plate further removed from said delivery end will be heated to a lower temperature, conveyor means for sliding the articles to be toasted along said toasting plate, and an upper oven positioned over a part of said toasting plate.

2. In a toasting machine of the character described, a toasting plate, means for heating said toasting plate, said means so arranged that sections of said plate near its receiving end and near its discharge end will be heated to high toasting temperature and that a portion of said plate between said first-mentioned sections will be heated to a lower temperature, means for sliding articles to be toasted along said plate, and means for automatically pressing said articles to be toasted against said plate when said articles have reached said cooler portion of said plate, whereby said articles to be toasted will be first subjected to a hot section of said plate to receive a slight searing and then moved to the cooler section of said plate before being pressed against said plate, in order to prevent said articles from sticking to said plate at any point.

3. In a toasting machine of the character described, a lower oven, a toasting plate on the top of said lower oven, said lower oven divided into compartments, a heating element in each compartment, conveyor means for sliding the articles to be toasted along said toasting plate, an upper oven positioned over a portion of said toasting plate adjacent the delivery end of said toasting plate.

4. In a bun toasting machine, a lower oven, a toasting plate on the top of said lower oven, said lower oven divided into compartments, a heating element in each compartment, said heating elements so arranged that the portion of said toasting plate above the compartment nearest the delivery end of the machine will be heated to a high toasting temperature, conveyor means for sliding the bun halves along said toasting plate, an upper oven positioned over said toasting plate, moving weights in said upper oven adapted to rest on the tops of the bun halves, whereby to keep said bun halves pressed against said toasting plate, means for moving said weights in unison with the movement of said conveyor means.

5. In a toasting machine adapted for use with sliced buns, a toasting plate, means for heating said toasting plate, said means so arranged that a portion of said plate near the delivery end of said machine will be heated to a high toasting temperature, conveyor means for sliding the bun halves along said toasting plate, an upper oven positioned over a portion of said toasting plate adjacent the delivery end of said toasting plate, moving weights in said upper oven adapted to rest on the tops of the bun halves, whereby to keep said bun halves pressed against said toasting plate, means for moving said weights in unison with the movement of said conveyor means.

6. In a toasting machine of the character described, a toasting plate, means for heating said toasting plate, conveyor means for sliding the articles to be toasted along said toasting plate, an upper oven positioned over said toasting plate, a pair of endless chains in said upper oven, means for moving said chains in unison with said conveyor means, weights carried by said upper oven chains and adapted to keep said articles to be toasted pressed against said toasting plate, said weights comprising discs, apertures in said discs to permit the escape of vapor therethrough during the toasting.

7. In a toasting machine adapted for use with sliced buns, a toasting plate, means for heating said toasting plate, conveyor means for sliding the bun halves along said toasting plate, said conveyor means including a pair of endless chains and flights extending between said chains, an upper oven positioned over said toasting plate, a pair of endless chains in said upper oven, means for moving said upper oven chains in unison with said first-mentioned conveyor means, weights carried by said upper oven chains and adapted to rest on top of said bun halves and keep them pressed against said toasting plate, said weights comprising discs, stems attached to said discs, supporting blocks carried by said upper oven chains slidably supporting said disc stems, means on the opposite ends of said stems to prevent said stems sliding through said blocks.

8. The combination described in claim 7 with restraining means holding said discs against said blocks until said discs are positioned directly above the bun halves.

9. In a toasting machine, a toasting plate, means for heating said toasting plate, conveyor means for sliding the articles to be toasted along said toasting plate, an upper oven positioned over a portion of said toasting plate, moving weights in said upper oven adapted to rest on the tops of the articles to be toasted, whereby to keep said articles to be toasted pressed against said toasting plate, means for moving said weights in unison with the movement of said conveyor means, said weights comprising discs, apertures in said discs to permit the escape of vapor therethrough during the toasting, rings attached to said discs and adapted to bear on said articles to be toasted, apertures between said rings and said discs to facilitate further the escape of vapor during the toasting.

10. In a toasting machine adapted for use with sliced buns, a toasting plate, means for heating said toasting plate, conveyor means for sliding the bun halves along said toasting plate, said conveyor means including pairs of endless chains and flights extending between each pair of said chains, an upper oven positioned over said toasting plate, pairs of endless chains in said upper oven, means for moving said upper oven chains in unison with said first-mentioned conveyor means respectively, weights carried by said upper oven chains and adapted to rest on top of said bun halves and keep them pressed against said toasting plate, said weights comprising discs having concave faces, apertures in said discs to permit the escape of vapor from said bun halves during the toasting and heating.

11. In a toasting machine of the character described adapted for use with sliced buns, a toasting plate, conveyor means for sliding the bun halves along said toasting plate, an upper oven positioned over said toasting plate, moving weights in said upper oven adapted to rest on the tops of the bun halves, whereby to keep said bun halves pressed against said toasting plate, means for moving said weights in unison with the movement of said conveyor means, said weights comprising discs having concave faces, rings attached to some of said discs, apertures in said discs and apertures between said rings and said discs to permit the escape of vapor from said bun halves during the toasting and heating.

12. In a toasting machine of the character described adapted for use with sliced buns, a toasting plate, conveyor means for sliding the bun halves along said toasting plate, said conveyor means including two pairs of endless chains and flights extending between each pair of said chains, an upper oven positioned over said toasting plate, two pairs of endless chains in said upper oven, means for moving said upper oven chains in unison with said first-mentioned conveyor means, respectively, weights carried by said upper oven chains and adapted to rest on top of said bun halves and keep them pressed against said toasting plate, said weights comprising discs, the discs on one of said pairs of upper oven chains having attached rings adapted to bear on the bottom of inverted lower halves of the buns, the discs on the other pair of chains having a concave bearing face conforming approximately to the curvature of the top of the buns and adapted to bear directly on the top of the upper halves of the buns, apertures in said discs to permit the escape of vapor from said discs to permit the escape of vapor from said bun halves during the toasting and heating.

13. A bun toasting machine of the character described including, a toasting plate, means for heating said toasting plate, conveyor means for sliding the bun halves along said toasting plate, an upper oven positioned over said toasting plate, two pairs of endless chains in said upper oven, means for moving said chains in unison with said conveyor means respectively, weights carried by said upper oven chains and adapted to rest on top of said bun halves and keep them pressed against said toasting plate, said weights comprising discs, stems attached to said discs, supporting blocks carried by said upper oven chains slidably supporting said disc stems, means on the opposite ends of said stems to prevent said stems sliding through said blocks, the discs on one of said pairs of upper oven chains having attached rings adapted to bear on the bottom of inverted lower halves of the buns, the discs on the other pair of chains having a concave bearing face conforming approximately to the curvature of the top of the buns and adapted to bear directly on the top of the upper halves of the buns, apertures in said discs to permit the escape of vapor from said bun halves during the toasting and heating.

14. The combination described in claim 13 with additional apertures between said rings and said discs to permit the escape of vapor from said bun halves during the toasting and heating, and restraining means holding said discs against said blocks until said discs are positioned directly above the bun halves.

15. The combination described in claim 13 with the means for heating said toasting plate so arranged that a section of said plate near the delivery end of said machine will be heated to a high toasting temperature and a section of said plate immediately preceding said first-mentioned section will be heated to a lower temperature, and with the upper oven positioned over said toasting plate above the delivery end of said toasting plate.

SHERMAN G. MARRIOTT.